United States Patent
Ignaczak et al.

(10) Patent No.: US 10,486,549 B2
(45) Date of Patent: Nov. 26, 2019

(54) PARKING ASSIST OVERLAY

(71) Applicant: Ford Global Technologies, LLC, Dearborn, MI (US)

(72) Inventors: Brad Alan Ignaczak, Canton, MI (US); Ali Hassani, Ann Arbor, MI (US); Adil Nizam Siddiqui, Farmington Hills, MI (US); Paul Theodosis, Ann Arbor, MI (US); Christopher W. Bell, Livonia, MI (US); Thomas Edward Pilutti, Ann Arbor, MI (US); Brian Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 399 days.

(21) Appl. No.: 14/713,602

(22) Filed: May 15, 2015

(65) Prior Publication Data

US 2016/0332573 A1 Nov. 17, 2016

(51) Int. Cl.
*B60L 53/60* (2019.01)
*G06T 11/00* (2006.01)
*B60R 1/00* (2006.01)
*B62D 15/02* (2006.01)

(52) U.S. Cl.
CPC ............... *B60L 53/60* (2019.02); *B60R 1/00* (2013.01); *B62D 15/029* (2013.01); *G06T 11/00* (2013.01); *B60R 2300/305* (2013.01); *B60R 2300/806* (2013.01)

(58) Field of Classification Search
None
See application file for complete search history.

(56) References Cited

U.S. PATENT DOCUMENTS

| | | | |
|---|---|---|---|
| 8,483,899 B2 | 7/2013 | Martin | |
| 8,513,915 B2 | 8/2013 | Patel | |
| 8,624,548 B2 | 1/2014 | Yamazaki et al. | |
| 8,823,551 B1* | 9/2014 | Hoffman | B60L 11/182 340/932.2 |
| 2010/0089677 A1* | 4/2010 | Tanaka | B62D 15/0285 180/204 |
| 2012/0262002 A1 | 10/2012 | Widmer et al. | |
| 2014/0132208 A1* | 5/2014 | Fisher | H02J 5/005 320/108 |
| 2014/0191568 A1 | 7/2014 | Partovi | |
| 2014/0217966 A1 | 8/2014 | Schneider | |
| 2014/0232331 A1 | 8/2014 | Stamenic et al. | |
| 2014/0327391 A1 | 11/2014 | Niederhauser et al. | |
| 2015/0343916 A1* | 12/2015 | Kim | B60L 11/1835 701/22 |

FOREIGN PATENT DOCUMENTS

| | | | |
|---|---|---|---|
| CN | 103832337 A | 6/2014 | |
| JP | 2010226945 A * | 10/2010 | ............ B60L 11/182 |
| WO | WO 2014183926 A2 | 11/2014 | |
| WO | WO-2015114775 A1 * | 8/2015 | ................ B60L 3/00 |

* cited by examiner

*Primary Examiner* — James M Anderson, II
(74) *Attorney, Agent, or Firm* — Frank Lollo; Bejin Bieneman PLC

(57) ABSTRACT

A vehicle system includes a camera and a display device. The camera is configured to capture an image and the display device is programmed to display the image. Each image includes a target, and the display device displays a virtual overlay on the image. The virtual overlay is displayed on the display device at a fixed location.

16 Claims, 3 Drawing Sheets

PARKING ASSIST OVERLAY

BACKGROUND

Electric vehicles use an electric power source, such as a battery, to power an electric motor that causes the vehicle to move. The operation of the electric motor depletes the battery. The battery can be recharged at a charging station. Charging stations can include a power outlet that receives a plug connected to the vehicle battery. Alternatively, the battery may be powered by inductive charging, which may also be referred to as wireless charging. Inductive charging may occur when the electric vehicle is parked on or near an inductive charging pad with an induction coil. Energy from the pad may be transmitted to the battery via an inductive coupling.

DETAILED DESCRIPTION

The range of a wireless charging station is limited. The wireless charging receiver connected to the battery must be within a certain distance of the wireless charging station to charge efficiently or at all. Therefore, a wireless charging zone, defining an area relative to the charging transmitter where charging is most efficient, may be established. The wireless charging zone may define how close to the resonators located on the charging pad the inductive coupling must be for efficient charging of the battery. The tolerance of the wireless charging zone may be small, on the order of e.g., 5 cm. Failing to properly align the vehicle relative to the charging pad and within the wireless charging zone may result in inefficient, or possibly ineffective, charge.

One way to help guide a vehicle to the wireless charging zone includes a parking assist system having a camera configured to capture an image that includes a target. The vehicle may further include a display device programmed to display the image. The display device displays a virtual overlay on the image. The virtual overlay is displayed on the display device at a fixed location. The vehicle is in the wireless charging zone when the virtual overlay and target are co-located on the display device. The driver of the vehicle can easily move the vehicle into the wireless charging zone by navigating the vehicle until the overlay is aligned with the target.

The elements shown may take many different forms and include multiple and/or alternate components and facilities. The example components illustrated are not intended to be limiting. Indeed, additional or alternative components and/or implementations may be used.

Figure 1:
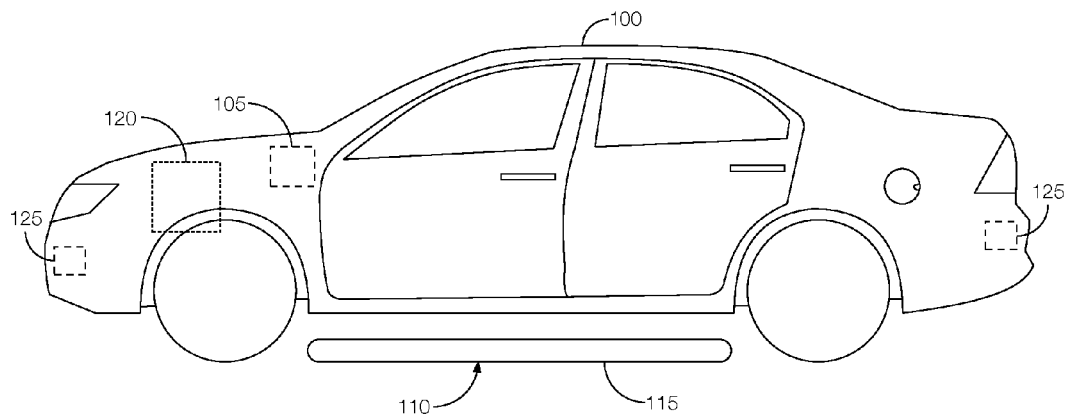
FIG. 1 illustrates an example vehicle including a park assist system for helping guide the vehicle to a location relative to a wireless charging station.

As illustrated in FIG. 1, the host vehicle 100 includes a park assist system 105 for helping guide the host vehicle 100 to a location relative to a wireless charging station 110. The wireless charging system may include a charging pad 115 with resonators, such as induction coils, that transmit energy to a battery 120 located on the host vehicle 100. The battery 120 may charge when the host vehicle 100 is parked over the charging pad 115, and the most efficient charging of the battery 120 may occur when the vehicle is within a wireless charging zone. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode. Moreover, the host vehicle 100 may include an electric or hybrid electric vehicle having an electric motor powered by the battery 120.

Figure 2:
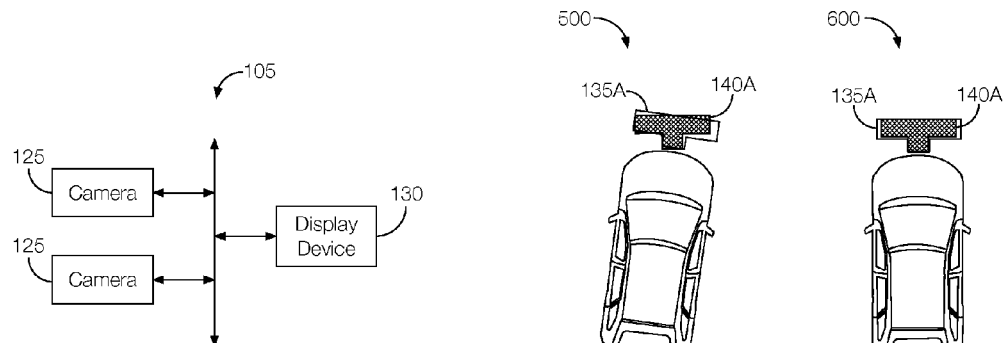
FIG. 2 is an example block diagram of the park assist system.

Referring now to FIG. 2, the park assist system 105 may include cameras 125 and a display device 130. The cameras 125 may be located on an exterior of the host vehicle 100 and the display device 130 may be located in a passenger compartment of the host vehicle 100.

Each camera 125 may include any electronic device programmed to capture an image. The cameras 125 may be located on the host vehicle 100, and cameras 125 may be located on different sides of the host vehicle 100. For instance, cameras 125 may be located at the front, rear, driver side, and passenger side of the host vehicle 100. Moreover, multiple cameras 125 may be positioned on each side of the host vehicle 100. For purposes of simplicity, only two cameras 125 are shown in FIG. 2. The images captured by each camera 125 may represent a live video feed of a view in front of, next to, behind, above, or below the host vehicle 100.

The display device 130 may include any computing or processing device programmed to process and display one or both images. When approaching the wireless charging station 110, one or both images may include a target 140 (see FIGS. 3-4). The target 140 may be located, e.g., on the ground in front of behind, or next to the host vehicle 100. When the host vehicle 100 is close enough to the target 140, the target 140 may appear in the image presented on the display device 130. The target 140 may be used to guide the host vehicle 100 toward the wireless charging zone.

The display device 130 may be further programmed to present a virtual overlay 135 (See, e.g., FIG. 3) onto the image. The virtual overlay 135 may be presented on the display device 130 at a fixed location. That is, regardless of what is shown on the display device 130, the virtual overlay 135 may be presented near the top, bottom, center, left, or right side of the display device 130. Fixing the location of the virtual overlay 135 helps the operator of the host vehicle 100 consistently navigate the host vehicle 100 toward the targets 140 And over the charging pad 115 in a precise and repeatable manner. The fixed location of the virtual overlay 135 may depend on the orientation of the host vehicle 100 relative to the charging pad 115. For instance, the virtual overlay 135 may appear at one fixed location if the host vehicle 100 is moving forward toward the charging pad 115 and at another fixed location if the host vehicle 100 is moving backward toward the charging pad 115.

Virtual overlays 135 with different geometric shapes may be used for different directions of travel of the host vehicle 100. For instance, the virtual overlay 135 on the image showing a direction of travel of the host vehicle 100 (i.e., a forward view when the host vehicle 100 is moving forward and a rear view when the host vehicle 100 is moving backward) may have one geometric shape, such as a T-shape, while the virtual overlay 135 on the image showing a direction opposite the direction of travel (i.e., a rear view when the host vehicle 100 is moving forward and a forward view when the host vehicle 100 is moving backward) may have a different geometric shape, such as a rectangular shape. The geometric shape of the target 140 may generally be the same as the geometric shape of the virtual overlay 135. Because the geometric shape of the virtual overlay 135 may change based on the direction of travel of the host vehicle 100, the same target 140 may be used regardless of whether the host vehicle 100 moving forward or backward toward the charging pad 115. Further, because the fixed location of the virtual overlay 135 may change with the direction of travel of the host vehicle 100, the virtual overlays 135 help the operator navigate the host vehicle 100 to an appropriate position on the charging pad 115 regardless of whether the host vehicle 100 is driven forward or backward toward the charging pad 115.

Figure 3:
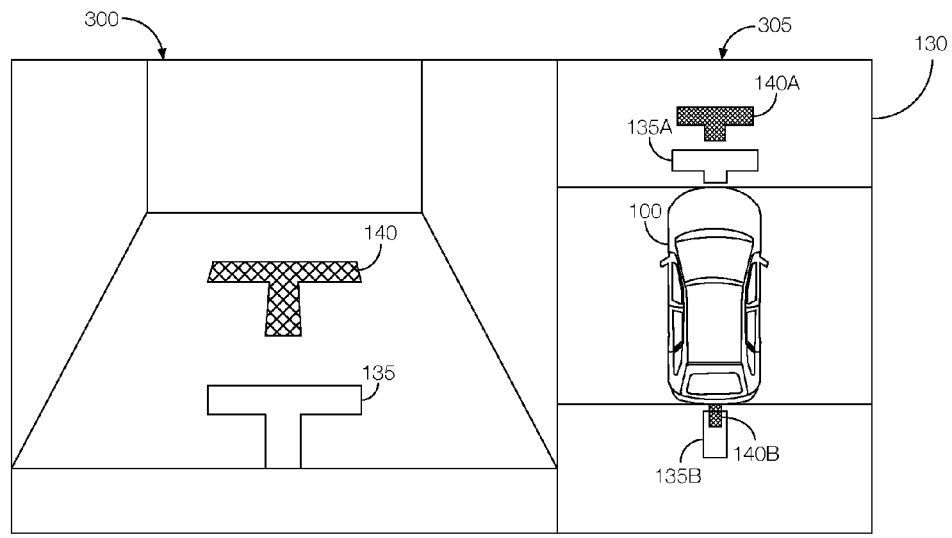
FIG. 3 is an example view of a display device showing an image of a view in a direction of travel of the vehicle and a virtual overhead view of the vehicle prior to alignment with a target.
Figure 4:
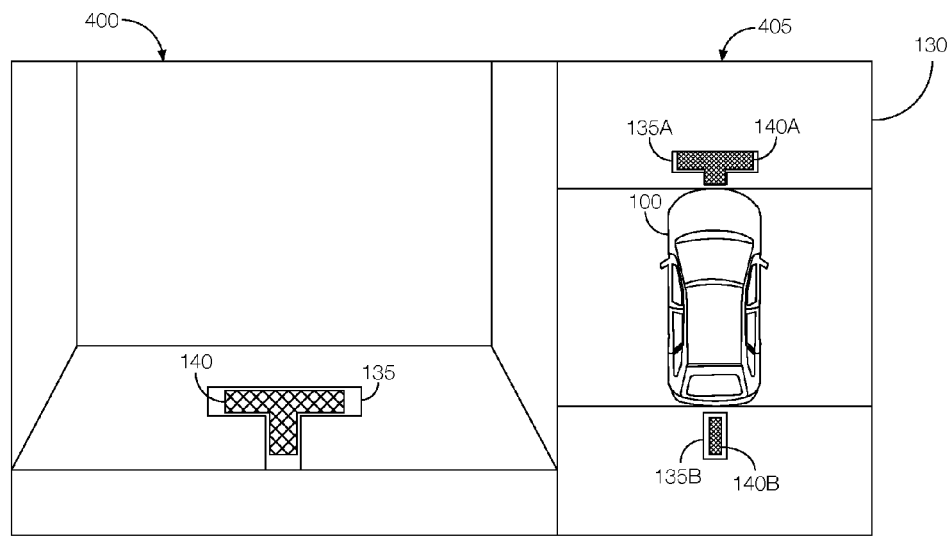
FIG. 4 is an example view of a display device showing an image of a view in a direction of travel of the vehicle and a virtual overhead view of the vehicle after alignment with the target.

FIG. 3 is an example view of a display device 130 showing an image 300 of a view in a direction of travel of the host vehicle 100 and a virtual overhead view 305 of the host vehicle 100 prior to alignment with the target 140. In the example of FIG. 3, the direction of travel includes the host vehicle 100 moving forward toward the target 140. As shown, both the virtual overlays 135 And the target 140 have a generally T-shaped configuration at the front of the host vehicle 100 and a generally rectangular configuration near a rear of the host vehicle 100. The host vehicle 100 is in the wireless charging zone when both the front virtual overlays 135A and the rear virtual overlay 135B are aligned with and overlap the front targets 140A and the rear targets 140B, respectively. By moving the host vehicle 100 toward the target 140 in such a way that both the front virtual overlays 135A and rear virtual overlay 135B overlap and align with the front targets 140A and rear targets 140B, the operator of the host vehicle 100 can use the image 300 and the overhead view 305 to align the host vehicle 100 with the charging pad 115. FIG. 4 shows an image 400 and overhead view 405 of the front virtual overlays 135A aligned with the front targets 140A and the rear virtual overlay 135B aligned with the rear targets 140B. When the host vehicle 100 is in this position relative to the targets 140, the battery 120 may be efficiently charged by the charging pad 115.

In some instances, the display device 130 may be programmed to selectively display different images based on, e.g., the direction of travel of the host vehicle 100. For instance, in selecting whether to present an image from the front-facing camera 125 or the rear-facing camera 125, the display device 130 may be programmed to determine whether the host vehicle 100 is travelling forward or backward toward the target 140. If travelling forward, the display device 130 may be programmed to display the image from the front-facing camera 125. If travelling backward, the display device 130 may be programmed to display the image from the rear-facing camera 125. In either event, one virtual overlays 135A may be shown in the direction of travel of the host vehicle 100 (e.g., the front of the host vehicle 100 for forward movement and the rear of the host vehicle 100 for backward movement) while the other virtual overlay 135B may be shown on the side of the host vehicle 100 opposite the direction of travel (e.g., the rear of the host vehicle 100 for forward movement and the front of the host vehicle 100 for backward movement). Therefore, the virtual overlay 135 may match the target 140 the host vehicle 100 is approaching. Moreover, so as to not confuse the operator of the host vehicle 100, the overhead view of the host vehicle 100 may be reversed when the host vehicle 100 is moving backward. Either the image of the host vehicle 100 itself may be reversed or the position of the front targets 140A and the rear targets 140B may be reversed.

Figures 5, 6:
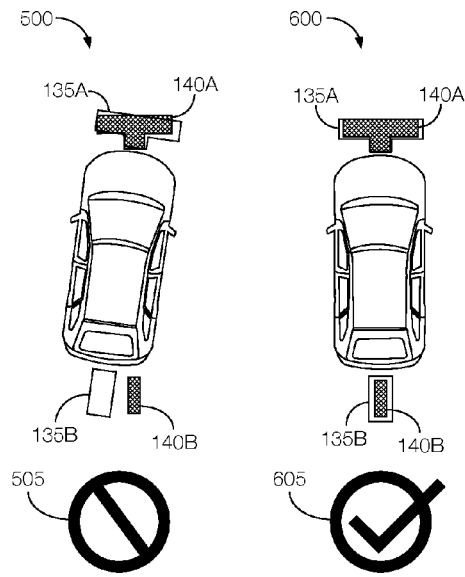
FIG. 5 is an example virtual overhead view of a failed parking maneuver.
FIG. 6 is an example virtual overhead view of a successful parking maneuver.

Referring now to FIGS. 5 and 6, the display device 130 may be programmed to indicate whether the parking maneuver has failed or was successful. FIG. 5 shows an example overhead view 500 of a failed parking maneuver that may be presented on the display device 130. As shown, the front virtual overlays 135A is aligned with and overlaps the front targets 140A but the rear virtual overlay 135B is not aligned with, nor does it overlap, the rear targets 140B. Therefore, the host vehicle 100 is not in the wireless charging zone. The display device 130 may be programmed to present a warning 505 indicating that the parking maneuver has failed and that the battery 120 is not in a position relative to the charging pad 115 to charge efficiently. FIG. 6 shows an example overhead view 600 of a successful parking maneuver that may be displayed on the display device 130. The front virtual overlays 135A is aligned with and overlaps the front targets 140A and the rear virtual overlay 135B is aligned with and overlaps the rear targets 140B. Thus, the host vehicle 100 is in the wireless charging zone. The display device 130 may be programmed to present an indication 605 that the parking maneuver was successful and that the battery 120 can be charged efficiently in this position relative to the charging pad 115.

In an alternative approach, the display device 130 may be programmed to change the color of the virtual overlay 135 Based on whether the virtual overlay 135 is aligned with and overlapping the target 140. For instance, the virtual overlay 135 may be red when the virtual overlay 135 is not aligned with and overlapping the targets 140 And may turn another color, such as green, when the virtual overlay 135 overlaps the target 140. The virtual overlay 135 may be at least partially transparent so that the virtual overlay 135 does not completely obscure other objects in the image, such as the target 140. In addition or as an alternative to changing colors, the display device 130 may provide an audible or tactile alert that the virtual overlay 135 has been aligned with and overlaps the target 140. In some instances, the display device 130 may include guide lines that show the driver where the host vehicle 100 will be relative to the target 140 if the host vehicle 100 continues on its current trajectory.

Figure 7:
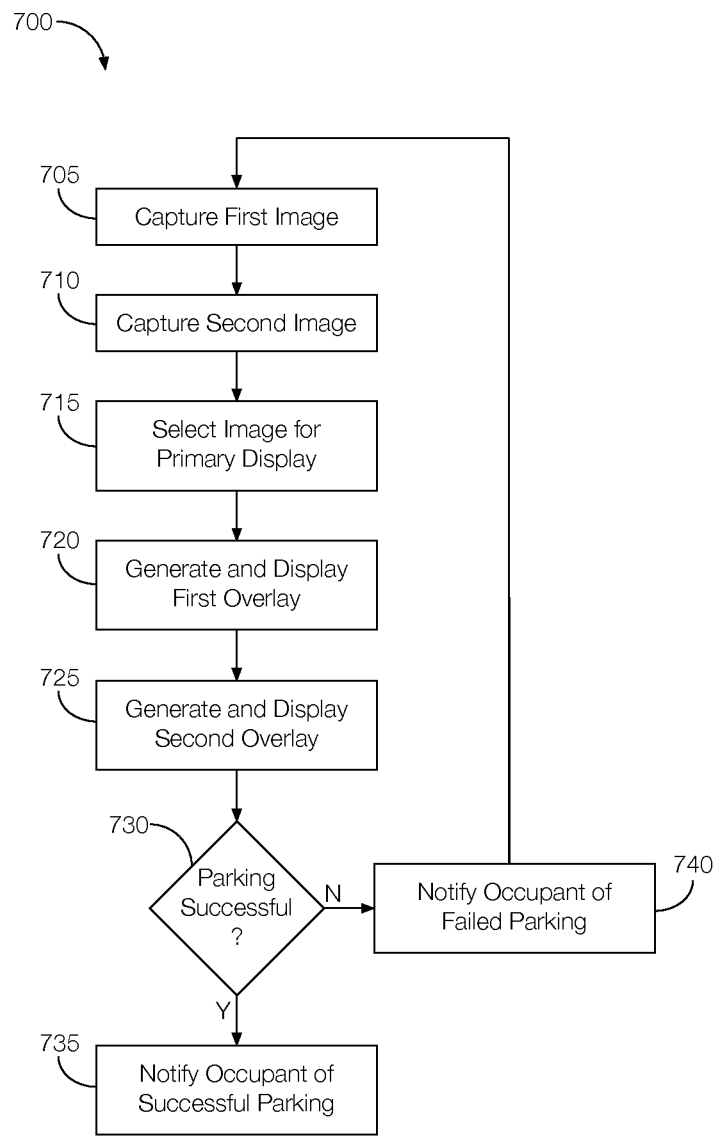
FIG. 7 is a flowchart of an example process that may be executed by the park assist system to help a user guide the vehicle to a location relative to a wireless charging station.

FIG. 7 is a flowchart of an example process 700 that may be executed by the park assist system 105 to help a user guide the vehicle to a location relative to a wireless charging station 110. The process 700 may be initiated automatically when the host vehicle 100 is near a wireless charging station 110 or in response to a user input indicating a user's desire to park the host vehicle 100 over a charging pad 115.

At block 705, the park assist system 105 may capture a first image. The first image may be captured by, e.g., the front-facing camera 125 located near a front end of the host vehicle 100. The image, therefore, may represent a view in front of the host vehicle 100. The image may include a live video feed of the view in front of the host vehicle 100.

At block 710, the park assist system 105 may capture a second image. The second image may be captured by, e.g., the rear-facing camera 125 located near a rear end of the host vehicle 100. The image, therefore, may represent a view behind the host vehicle 100. The image may include a live video feed of the view behind the host vehicle 100.

At block 715, the park assist system 105 may determine whether to display the first image or the second image as the primary image in the display device 130. The primary image may refer to, e.g., the image 300 or 400 in FIGS. 3 and 4, respectively, as opposed to the overhead views 305 and 405 shown in FIGS. 3 and 4. The decision whether to display the first image or the second image may be based, at least in part, on a direction of travel of the host vehicle 100. For instance, if the host vehicle 100 is moving forward toward the charging pad 115, the display device 130 may select the first image for display. If the host vehicle 100 is moving backward toward the charging pad 115, the display device 130 may select the second image for display. Both the first image and the second image may each include a target 140, and the targets 140 in each image may have different geometric shapes.

At block 720, the park assist system 105 may generate and display a first virtual overlay 135. The first virtual overlay 135 may be generated and displayed by the display device 130 at a fixed location relative to the image selected at block 715 as well as in the overhead view. The fixed location may include a location in the image, the overhead view, or both. The first virtual overlay 135 may have a geometric shape similar to one of the targets 140. When the host vehicle 100 is moving forward toward the target 140, the first virtual overlay 135 may have a geometric shape similar to that of the front targets 140A. When the host vehicle 100 is moving backward toward the target 140, the first virtual overlay 135 may have a geometric shape similar to that of the rear targets 140B.

At block 725, the park assist system 105 may generate and display a second virtual overlay 135. The second virtual overlay 135 may be generated and displayed by the display device 130 at a fixed location relative to the image selected at block 715 as well as in the overhead view. The fixed location may include a location in the image, the overhead view, or both. The second virtual overlay 135 may have a geometric shape similar to one of the targets 140. When the host vehicle 100 is moving backward toward the target 140, the second virtual overlay 135 may have a geometric shape similar to that of the front targets 140A. When the host vehicle 100 is moving forward toward the target 140, the second virtual overlay 135 may have a geometric shape similar to that of the rear targets 140B.

At decision block 730, the park assist system 105 may determine whether the parking maneuver was successfully executed. That is, the park assist system 105 may determine whether the host vehicle 100 has been parked in a way that permits high efficiency charging of the battery 120 by the wireless charging station 110. When the host vehicle 100 is moving forward toward the charging pad 115, the determination of whether the parking maneuver was successfully executed may be based on, e.g., whether the first virtual overlay 135 is aligned with and overlaps the front targets 140A and whether the second virtual overlay 135 is aligned with and overlaps the rear targets 140B. When the host vehicle 100 is moving backward toward the charging pad 115, the determination of whether the parking maneuver was successfully executed may be based on, e.g., whether the second virtual overlay 135 is aligned with and overlaps the front targets 140A and whether the first virtual overlay 135 is aligned with and overlaps the rear targets 140B. If the parking maneuver was successfully executed, the process 700 may proceed to block 735. If the parking maneuver was not successfully executed, the process 700 may proceed to block 740.

At block 735, the park assist system 105 may notify the occupant that the parking maneuver was successfully executed and that the host vehicle 100 is in the wireless charging zone. The notification of the successful parking maneuver may be presented on the display device 130 and may indicate, e.g., that the battery 120 will efficiently charge. The process 700 may end after block 735.

At block 740, the park assist system 105 may notify the occupant that the parking maneuver was not successfully executed and that the host vehicle 100 is not in the wireless charging zone. The notification of the failed parking maneuver may be presented on the display device 130 and may indicate that, e.g., the battery 120 will not efficiently charge or is unable to charge until the host vehicle 100 is moved to the right position relative to the charging pad 115. The process 700 may proceed to block 705 after block 740.

Accordingly, the park assist system 105 helps an operator of the host vehicle 100 to guide the host vehicle 100 to the wireless charging zone that will offer the greatest efficiencies for charging the battery 120.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
    a first camera configured to capture a first image including a first target;
    a second camera configured to capture a second image including a second target; and
    a display device programmed to display a virtual overhead view of a vehicle based on the first image and the second image,
    wherein the virtual overhead view includes: a first virtual overlay ahead of the virtual overhead view of the vehicle, a second virtual overlay behind the virtual overhead view of the vehicle, a virtual representation of the first target, and a virtual representation of the second target so that the vehicle may be charged wirelessly when both the first virtual overlay is aligned with the first target and the second virtual overlay is aligned with the second target,
    wherein the first virtual overlay and the second virtual overlay are displayed on the display device at a fixed orientation relative to the vehicle.

2. The vehicle system of claim 1, wherein the first image includes an area ahead of the vehicle.

3. The vehicle system of claim 2, wherein the area ahead of the vehicle includes an area in a direction of travel of the vehicle.

4. The vehicle system of claim 1, wherein the second image includes an area behind the vehicle.

5. The vehicle system of claim 4, wherein the area behind the vehicle includes an area opposite a direction of travel of the vehicle.

6. The vehicle system of claim 1, wherein the first virtual overlay displayed on the virtual overhead view and the first target have the same geometric shape.

7. The vehicle system of claim 1, wherein the first target and second target are associated with aligning the vehicle with a wireless charging station.

8. The vehicle system of claim 1, wherein the display device is programmed to display one of the first image and the second image simultaneously with displaying the virtual overhead view based at least in part on a direction of travel of a vehicle relative to a wireless charging station.

9. A method comprising:
    capturing a first image;
    capturing a second image;
    displaying one of the first image and the second image on a display device, wherein the first image includes a first target and the second image includes a second target;
    generating a first virtual overlay;
    generating a second virtual overlay;

generating a virtual representation of the first target;
generating a virtual representation of the second target; and
displaying the first virtual overlay, the second virtual overlay, the virtual representation of the first target, and the virtual representation of the second target in a virtual overhead view of a vehicle so that the vehicle may be charged wirelessly when both the first virtual overlay is aligned with the first target and the second virtual overlay is aligned with the second target, wherein the first virtual overlay is displayed ahead of the virtual overhead view of the vehicle and wherein the second virtual overlay is displayed behind the virtual overhead view of the vehicle, wherein the first virtual overlay and the second virtual overlay are displayed in the virtual overhead view at a fixed orientation relative to the vehicle.

10. The method of claim 9, wherein the first image includes an area ahead of the vehicle and wherein the second image includes an area behind the vehicle.

11. The method of claim 9, wherein the area ahead of the vehicle includes an area in a direction of travel of the vehicle and wherein the area behind the vehicle includes an area opposite the direction of travel of the vehicle.

12. The method of claim 9, wherein the first virtual overlay displayed on the first image has a different geometric shape than the second virtual overlay displayed on the second image.

13. The method of claim 9, wherein the first target in the first image and the first virtual overlay have a first geometric shape.

14. The method of claim 13, wherein the second target in the second image and the second virtual overlay have a second geometric shape.

15. The method of claim 14, wherein the first geometric shape is different from the second geometric shape.

16. The method of claim 9, wherein the first and second targets are associated with aligning a vehicle with a wireless charging station.

* * * * *